April 22, 1952 H. L. NEILSEN 2,593,475

TELEPHONE INDEX

Filed March 15, 1948 2 SHEETS—SHEET 1

INVENTOR
Heldaur L. Neilsen
BY
Em Palmer
ATTORNEY

April 22, 1952 H. L. NEILSEN 2,593,475

TELEPHONE INDEX

Filed March 15, 1948 2 SHEETS—SHEET 2

INVENTOR
Hildaur L. Neilsen
BY
C. Palmer
ATTORNEY

Patented Apr. 22, 1952

2,593,475

UNITED STATES PATENT OFFICE 2,593,475

TELEPHONE INDEX

Hildaur L. Neilsen, Metuchen, N. J., assignor to Speed Products Company, Inc., New York, N. Y., a corporation of New York Application March 15, 1948, Serial No. 14,967

16 Claims. (Cl. 40—104)

This invention relates to automatic index devices and more particularly to a combined telephone stand and automatic index device.

An object of the invention is to provide an automatic index device to serve as a stand for a telephone instrument whereby ready reference may be had to telephone numbers, addresses and the like.

Another object of the invention is to provide an automatic index suitable for one hand operation leaving the other hand free to hold a telephone receiver.

A further object of the invention is the provision of a telephone stand and index which takes up substantially no desk room beyond that required for the telephone.

Other objects and features will be found in the following description given with the aid of the accompanying drawings wherein.

Figures 1, 2, 3, 4:
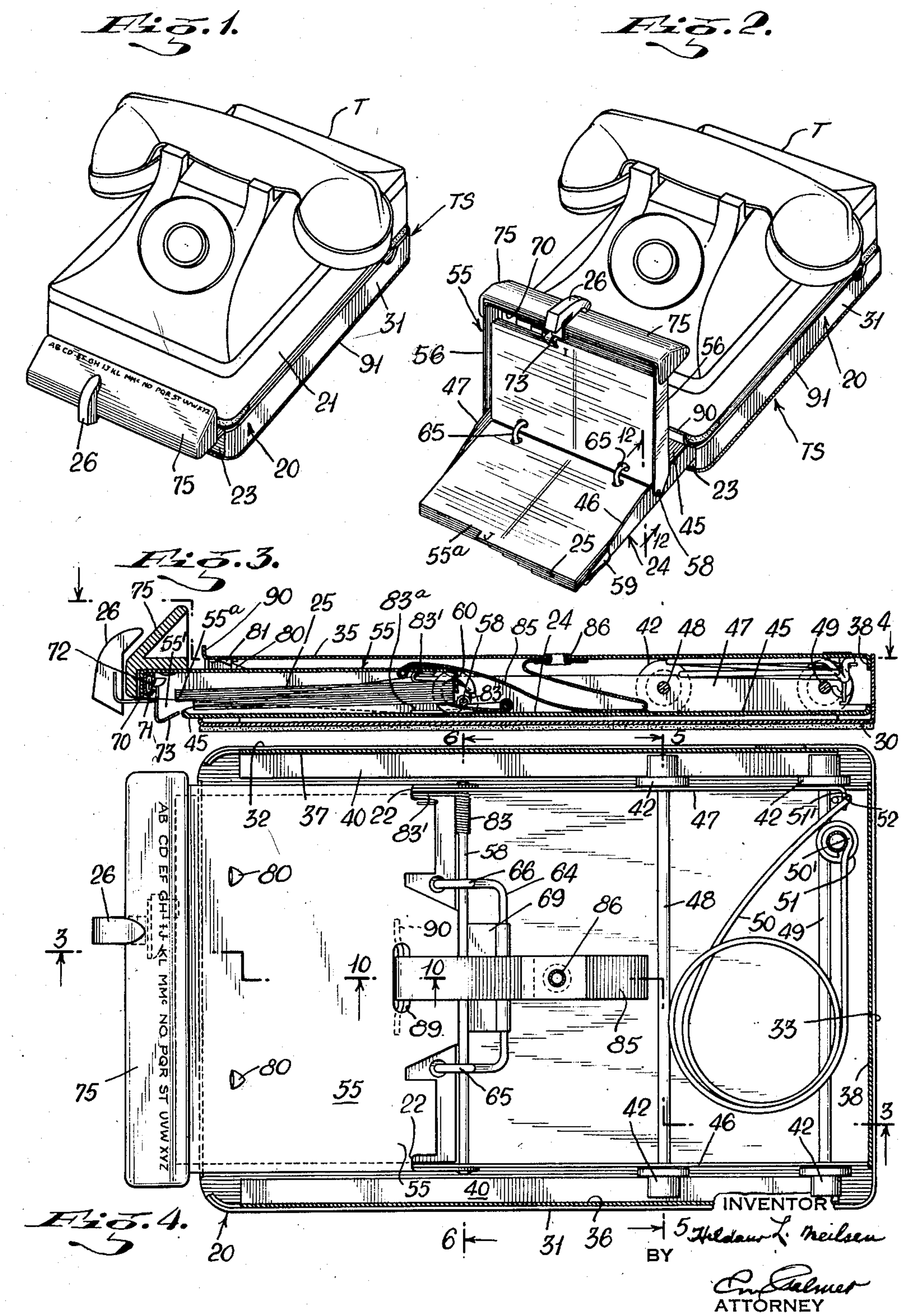
Fig. 1 is a perspective view showing a conventional telephone desk instrument resting on an index device constructed in accordance with the preferred embodiment of the invention.
Fig. 2 is a view similar to Fig. 1 showing the index device as it appears when opened.
Fig. 3 is a longitudinal sectional view on the line 3—3 of Fig. 4.
Fig. 4 is a sectional view on the line 4—4 of Fig. 3, however partly broken away to illustrate the internal construction.

Illustrative of the embodiment disclosed, the index device generally denoted TS comprises a flat generally oblong casing 20 which in the present embodiment is shaped in conformity with the base 21 of a conventional telephone T. The casing at its front is provided with an opening 23 to permit withdrawal or retraction of the slidably guided drawer 24 adapted to support a stack of index cards 25 selectably separated and lifted by a manually settable finder 26.

The casing 20 has a flat base member 30 (Fig. 5) formed with the upstanding side walls 31 and 32 interconnected by the rear wall 33. The front wall is omitted to provide as previously mentioned the opening 23 for the slidable drawer 24. A cover or closure 35 is formed with depending side walls 36 and 37 and has the rearwardly disposed interconnecting and depending lip 38. The cover 35 closely but removably fits or telescopes into the casing 20.

Depending side walls 36 and 37 of cover 35 are bent inwardly and thence downwardly (Figs. 5 and 6) forming the rails or tracks 40 guiding the flanged wheels 42. It will be observed that the lower offset portions 41 of sides 36 and 37 in cooperation with the bottom wall 30 of the casing 20 serve to limit insertion of the cover 35.

Slidable drawer or tray 24 is formed of sheet metal and consists of a flat base portion 45 having the upstanding side walls 46 and 47. Shafts 48 and 49 disposed in spaced relation toward the rear of the drawer 24 extend through suitable openings in side walls 46 and 47 and rotatably carry flanged wheels 42 which ride on the spaced rails 40, thus supporting the drawer so it is freely movable in spaced relation to the casing 20.

A large spiral spring 50 (Fig. 4) having one end 50′ (Fig. 5) secured to the cover member 35 by an eyelet 51 and having another end 51′ appropriately attached to lug 52 bent from side wall 47 is so tensioned as to constantly tend to urge, propel, or eject the drawer 24 outwardly from the casing.

Swingable cover or closure 55 for the drawer is provided with depending sides 56 closely but movably straddling sides or walls 46 and 47 of the drawer 24 (Fig. 2). The cover 55 is pivoted on sides 46 and 47 by a rod 58 extending through and retained by the sides of the drawer 24 and the sides of the cover 55. A lip 60 (Fig. 3) bent downward from the rear of the cover 55 serves to realign the stack of cards or sheets 25 by engaging the rear edges thereof on the closing of the cover. Stops 59, Fig. 2, projecting laterally from the side wall as 46 serve to limit the downward pivotal movement of the cover or closure 55 relative to the drawer or tray 24.

Cards 25 are preferably perforated in the usual manner for attachment to a ring binder generally designated 62 (Fig. 9) which comprises a U-shaped member having arms 63 and 64, which are curved back to form partially closed rings 65. The arms have notches 67 and 68 formed therein respectively. Mounted on binder 62 is the flat and slightly curved retaining leaf spring 69. The mid-portion of the binder is adapted to be inserted under fulcrum rod 58 with the notches 67 and 68 uppermost, and the spaced rings 65 disposed toward the front of the drawer, so that the notches 67 and 68 engage the under side of pivot rod 58 which is removably interlocked with the walls of notches 67 and such interlocking relation is maintained by the leaf spring 69. Cards 25 may be attached readily to the binder by passing the perforations therein over the partly closed rings 65 as is well understood.

When closed, the front end of the pivoted cover 55 (Fig. 3) projects beyond and overhangs the front end of the drawer 24, and the forward alined ends $55^a$ of the index cards extend into the open space or gap 55′. It is contemplated that the cards or groups of cards be formed in the well known manner with successively longer cut away portions $55^a$, which portions project into gap 55′.

Appropriately attached to the front wall 70 of the swingable cover 55 is the channeled member 71 (Fig. 8) which constitutes a track in which a slider 72 is linearly guided. This slider is desirably fastened to finder 26 and has the index and card pick up or lifting finger 73.

A curved spring detent member 74 is adapted to ride along and interlock with a toothed face or rack 74′ of the fixed channeled member 71 so that when the finder is once set, the detent member 74 tends to hold it in place. The lifting finger 73 is shaped so as to extend under the forward margins of the cards 25 above forward margins of the bottom wall 45 of the drawer 24 so that the finder 26 and finger 73 may be moved freely without the latter dragging on the cards. A bar 75 fastened to closure or cover 55 has suitable indicia, such as groups of letters to aid in positioning the slidably guided finder 26.

Near the front margin of the swingable cover 55 is a pair of struck out projections 80 cooperating or interlocking with complementary projections 81 depending from the top of the fixed cover member 35. When the drawer 24 is closed the projections 80 (Fig. 3) pass under projections or detents 81 to disengageably interlock therewith. In order to insure the latching engagement of cooperating locking projections 80 and 81, a coiled spring 83 is provided which always tends to elevate the front of the cover 55. Specifically however, spring 83 (Figs. 4, 6 and 11) is mounted on and about fulcrum rod 58, having one end 83′ attached to the pivoted cover 55 while its other end $83^a$ rests against the bottom of the drawer. In operation it will be understood that drawer 24 latches automatically when slidably closed since projections 80 and 81 interlock, and that manual downward pressure on the index bar 75, disengages or frees projections 80 and 81, at which time spring 50 acts to partly eject or withdraw the drawer 24 from the casing 20 (Fig. 2). The outward movement of the drawer 24 is utilized to automatically lift the swingable cover 55, thus causing finger 73 of the index mechanism to separate the sheets or cards thereof in accordance with the setting of the index finder 26. To this end a flexible fabric tape 85 has one end fastened by an eyelet 86 (Fig. 3) to the top of the cover member or platform 35 for the casing 20. The opposite or forward end of the tape is formed into a loop 88 (Fig. 10) which extends through a slot 89 in the drawer cover or pivoted closure 55 where it is retained by a pin 90 threaded through the loop 88 and is adapted to rest against the inner surface of the cover 55 which serve as a stop.

The tape 85 is of such length, as to be quite slack when the drawer 24 is closed as shown in Fig. 3, but when the drawer has been released, the tape becomes taut (Fig. 7) just after the rear margin of the drawer cover 55 has passed beyond the front of the casing 20. Since the tape is attached to the cover or closure 55 above fulcrum rod 58, continued outward movement of the drawer will swing the cover 55 on its pivot but rearwardly to fully open the same (Fig. 7) concomitantly limiting further outward movement of drawer 24 provided with reentrant notches 22 (Figs. 4 and 12) adapted to receive spaced sides 46 and 47 and cooperating therewith to also limit rearward swinging of the pivoted cover 55.

Briefly recapitulating, the finder 26 is slidably set to a selected position on the index bar 75, thus placing a certain portion of the cards above and in line with lifting finger 73. The index bar is now depressed. This action unlocks the latching detents or projections 80 and 81. Spring 50 now automatically withdraws drawer 24 until the swingable cover 55 is fully out of casing 20 at which time tape or flexible connection 85 becomes fully taut.

Figures 5, 6, 7, 8, 9, 10, 11, 12:
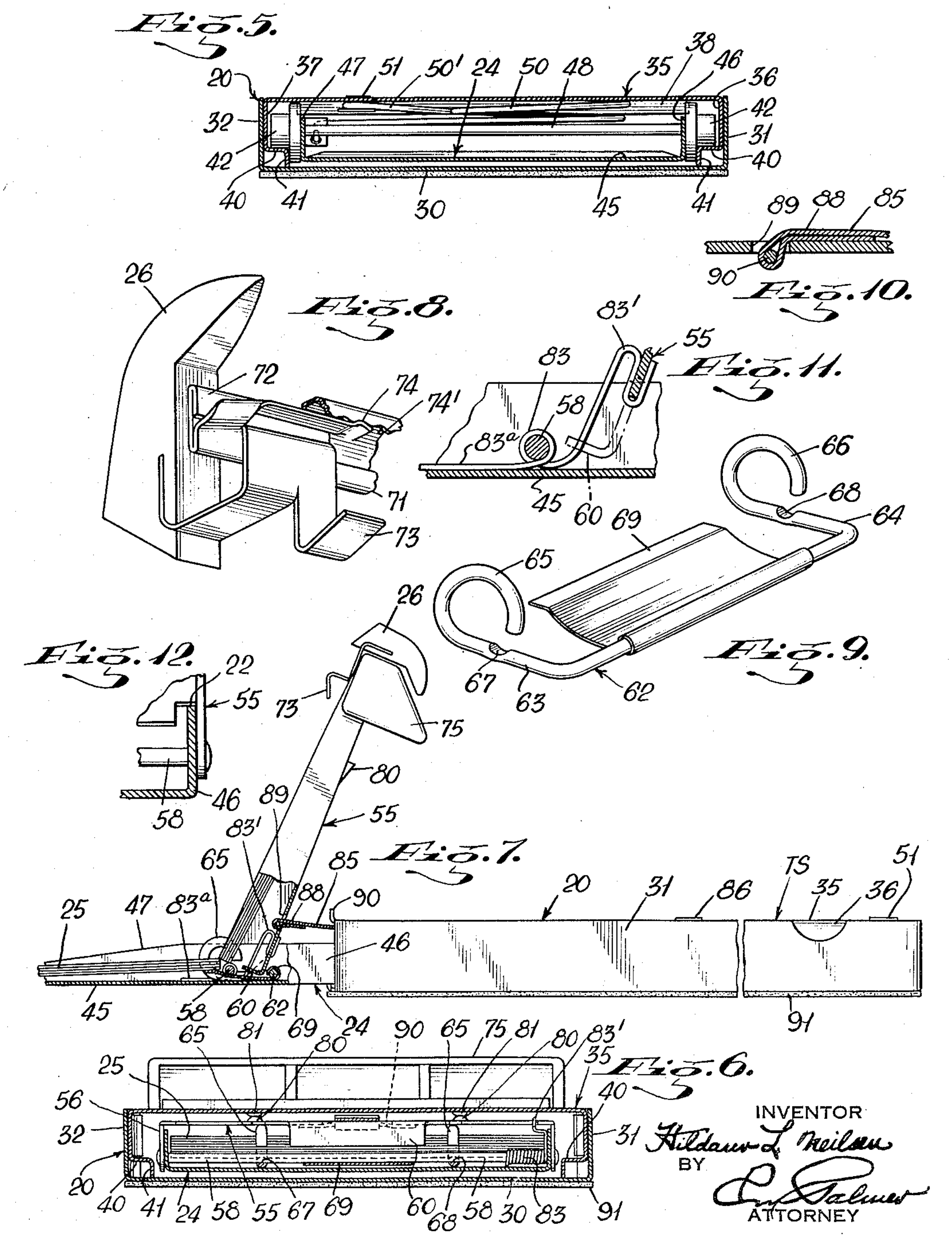
Fig. 5 is a transverse sectional view on the line 5—5 of Fig. 4.
Fig. 6 is a sectional view on the line 6—6 of Fig. 4.
Fig. 7 is a side view of the index device partly in section with the cover thereof fully opened or raised.
Fig. 8 is an enlarged perspective view of the index finder.
Fig. 9 is an enlarged perspective view of the ring bracket or retainer for holding the index cards together with the flat retaining spring therefor.
Fig. 10 is an enlarged sectional view on the line 10—10 of Fig. 4 showing the connection of the tape to the cover of the drawer for housing the index cards.
Fig. 11 is an enlarged showing of the spring for automatically elevating the swingable cover of the drawer on partial withdrawal of the latter from the casing.
Fig. 12 is a sectional view on the line 12—12 of Fig. 2 to illustrate that the sides of the drawer serve to limit opening of the swingable cover thereon.

Since the swingable cover or closure 55 is now free of the casing 20, terminal 83′ of spring 83 automatically and rearwardly tilts or fully opens this closure as shown in Figs. 2 and 7 at which time the end walls of notches 22 strike the sides of the drawer. In tilting rearwardly finger 73 picks up a certain portion of the cards or index means 25 and retains them within the pivoted closure 55 which thereafter may be quickly restored within the casing again upon manually tilting the closure 55 downwardly to telescope over the drawer after which the latter is manually moved inwardly against the resistance of spring 50 to automatically interlock the companion latching projections 80 and 81. If desired closure 55 may be automatically closed from its full open position. This is accomplished upon the application of an inwardly directed thrust on the now opened slidable drawer 24 causing closure 55 to strike or hit lip or abutment 90 of the cover member 35 whereby the closure 55 automatically tilts downwardly to fully close as the drawer 24 is shifted inwardly against the resistance of spring 50. Where the bar 75 is depressed to unlatch projections 80 and 81, drawer 24 automatically withdraws to a predetermined position due to tape or connection 85. If in closed relation, the drawer is concealed and locked or latched although readily accessible upon the application of a downward thrust on index bar 75. Cover member or platform 35 although telescoping within casing 20, serves as a support for the telephone T which is prevented from shifting forwardly by abutment or lip 90 at the forward end of the cover member 35. To prevent marring or scratching, the casing 20 is provided with the felt lining 91. By the arrangement disclosed, the drawer is instantly accessible, convenient and carries the index means or cards 25 selectively controlled by the slidable indexing pointer 26.

Various changes may be made in details of construction and arrangement of parts without departing from the spirit of the invention or sacrificing any of the advantages thereof inherent therein.

I claim:

1. An index device adapted to support a telephone desk set comprising a casing having an opening at one end, an index containing drawer disposed therein, automatic latch means for holding the drawer closed, a cover for the drawer, pivot means disposed toward the rear of the cover connecting the same to the sides of the drawer, spring means effective on the operation of the latch means for ejecting the drawer from the casing, and means effective to limit the outward movement of the drawer and at the same time open the cover which comprises a flexible elongated member having one end connected to the casing and the other to the cover in offset relationship to the axis of the pivot means.

2. An automatic index device adapted to support a telephone desk set comprising a casing having an opening at one end, an index containing drawer disposed therein, automatic latch means responsive to the closing of the drawer for holding the same closed, a cover for the drawer, pivot means disposed toward the rear of the cover connecting the same to the sides of the drawer, spring means effective on the operation of the latch means for ejecting the drawer from the casing, and means effective to limit the outward movement of the drawer and at the same time open the cover which comprises a flexible tape having one end fixed to the casing and the other secured to the cover in offset relationship to the axis of the pivot means.

3. An automatic index device adapted to support a telephone desk set comprising a casing having an opening at one end, an index containing drawer disposed therein, a cover for the drawer pivotally attached at its rear to the drawer whereby engagement of the cover with the top of the casing on the closing of the drawer lowers the cover to closed position, spring means connected between the casing and drawer tending to eject the latter from the casing, releasable means responsive to the closing of the drawer for retaining the same in closed position, and means effective on the operation of the releasable means for limiting the outward movement of the drawer and at the same time opening the cover which comprises a tape having one end fixed to the casing and the other to the cover.

4. An automatic index device adapted to support a telephone desk set comprising a casing having an opening at one end, an index containing drawer disposed therein, a cover for the drawer, pivot means attaching the rear of the cover to the drawer whereby engagement of the cover with the top of the casing on the closing of the drawer lowers the cover to closed position, cooperating members projecting from the top of the casing and cover adapted on the closing of the drawer to latch the same, spring means connected between the casing and drawer effective to eject the latter on the unlatching thereof, and a tape connected to the casing for limiting the outward movement of the drawer and elevating the cover.

5. An automatic index device comprising a casing having an opening at one end, a drawer disposed therein, a stack of index sheets disposed in the drawer, automatic latch means responsive to the closing of the drawer for holding the drawer within the casing, a cover pivotally attached to the drawer adapted to be closed by engagement with the casing as the drawer is being closed, spring means effective on the release of the latch means for ejecting the drawer from the casing, means connected to the cover responsive to the outward movement of the drawer for opening the same when the drawer has moved a predetermined distance, and a movable index finder attached to the cover cooperating with the index sheets effective on the opening of the cover to selectively separate the sheets.

6. An automatic index device comprising a casing having an opening at one end, a drawer disposed therein, a stack of index sheets disposed in the drawer, automatic latch means for holding the drawer within the casing, a cover for the drawer, pivot means disposed toward the rear of the cover connecting the same to the sides of the drawer, spring means effective on the operation of the latch means for ejecting the drawer from the casing, means effective to the outward movement of the drawer and at the same time open the cover comprising a flexible elongated member having one end connected to the casing and the other to the cover in offset relationship to the axis of the pivot means, and a movable index finger carried by the cover cooperating with the index sheets effective on the opening of the cover to selectively separate the sheets.

7. An automatic index device adapted to support a telephone desk set comprising a casing having an opening at one end, a drawer disposed therein, a stack of index sheets disposed in the drawer, automatic latch means responsive to the closing of the drawer for holding the same closed, a cover for the drawer, pivot means disposed toward the rear of the cover connecting the same to the sides of the drawer, spring means effective on the operation of the latch means for ejecting the drawer from the casing, means effective to limit the outward movement of the drawer from the casing, means effective to limit the outward movement of the drawer and at the same time to open the cover which comprises a flexible tape having one end fixed to the casing and the other secured to the cover in offset relationship to the axis of the pivot means, and a movable index finger carried by the cover cooperating with the index sheets effective on the opening of the cover to selectively separate the sheets.

8. An automatic index device comprising a casing having an opening at one end, a drawer disposed therein, a stack of index sheets in the drawer, a cover for the drawer pivotally attached at its rear to the drawer whereby engagement of the cover with the casing on the closing of the drawer lowers the cover to closed position, spring means connected between the casing and drawer tending to eject the latter from the casing, releasable means responsive to the closing of the drawer for holding the same in closed position, means effective on the operation of the releasable means for limiting the outward movement of the drawer and at the same time opening the cover which comprises a tape having one end fixed to the casing and the other secured to the cover, and a movable index finger carried by the cover cooperating with the index sheets effective on the opening of the cover to selectively separate the sheets.

9. An automatic index device comprising a casing having an opening at one end, a drawer disposed therein, a stack of index sheets in the drawer, a cover for the drawer, pivot means attaching the rear of the cover to the drawer whereby engagement of the cover and casing on the closing of the drawer lowers the cover to closed position, cooperating members projecting from the top of the casing and cover respectively adapted on the closing of the drawer to latch the same in closed position, spring means connected between the casing and drawer effective to eject the latter on the unlatching thereof, a tape connected between the casing and the cover for limiting the outward movement of the drawer and elevating the cover.

10. An automatic index device comprising a casing having an opening at one end, a drawer disposed therein, a stack of index sheets disposed in the drawer, automatic latch means for holding the drawer within the casing, a cover pivotally attached to the drawer adapted to be closed by engagement with the top of the casing when the drawer is pushed back into the casing, spring means effective on the release of the latch means for ejecting the drawer from the casing, means connected to the cover responsive to the outward movement of the drawer for opening the same when the drawer has moved a predetermined distance, an index scale fixed at the outer end of the cover, a movable finder supported at the end of the cover cooperating therewith, and a finger fixed to the finder adapted to engage selected ones of the sheets and on the opening of the cover to selectively separate the sheets.

11. An automatic index device comprising a casing having an opening at one end, a drawer disposed therein, a stack of index sheets disposed in the drawer, automatic latch means for holding the drawer closed, a cover for the drawer, pivot means disposed toward the rear of the cover connecting the same to the sides of the drawer, spring means effective on the release of the latch means for ejecting the drawer from the casing, means effective to limit the outward movement of the drawer and at the same time to open the cover comprising a flexible elongated member having one end connected to the casing and the other to the cover in offset relationship to the axis of the pivot means, an index scale fixed at the outer end of the cover, a movable finder supported at the end of the cover cooperating therewith, and a finger fixed to the finder adapted to engage selected ones of the sheets and on the opening of the cover to selectively separate the sheets accordingly.

12. An automatic index device adapted to support a telephone desk set comprising a casing having an opening at one end, a drawer disposed therein, a stack of index sheets in the drawer, automatic latch means responsive to the closing of the drawer for holding the same closed, a cover for the drawer, pivot means disposed toward the rear of the cover connecting the same to the sides of the drawer, spring means effective on the release of the latch means for ejecting the drawer from the casing, means effective to limit the outward movement of the drawer and at the same time to open the cover which comprises a flexible tape having one end fixed to the casing and the other secured to the cover in offset relationship to the axis of the pivot means, an index scale fixed to the outer end of the cover, a movable finder supported at the end of the cover cooperating therewith and a finger fixed to the finder adapted to engage selected ones of the sheets and on the opening of the cover to automatically separate the sheets accordingly.

13. An automatic index device comprising a casing having an opening at one end, a drawer disposed therein, a stack of index sheets disposed in the drawer, a cover pivotally attached to the drawer adapted to be closed on engagement with the top of the casing when the drawer is being closed, an index scale fixed to the outer end of the cover, a movable finder supported at the end of the cover cooperating therewith, a finger fixed to the finder adapted to engage selected ones of the sheets and on the opening of the cover to separate automatically the sheets accordingly, latch means releasable in response to a tap on the cover for retaining the drawer in closed position, spring means connected between the drawer and casing constantly tending to eject the drawer from the casing, and a flexible tape secured at one end to the casing and having the opposite end secured to the cover effective to limit the outward movement of the drawer and to open the cover.

14. An automatic index device comprising a casing having an opening at one end, a drawer disposed therein, a stack of index sheets disposed in the drawer, a cover for the drawer, pivot means disposed toward the rear of the cover connecting the same to the sides of the drawer, an index scale fixed to the outer end of the cover, a finder movably supported at the end of the cover cooperating therewith, a finger fixed to the finder adapted to engage selected ones of the sheets and on the opening of the cover to separate automatically the sheets accordingly, latch means comprising cooperating projections formed on the cover and the top of the casing releasable in response to a tap on the cover for retaining the drawer in closed position, spring means connected between the drawer and casing constantly tending to eject the drawer, and means for limiting the outward movement of the drawer and elevating the cover comprising a tape having one end connected to the casing and the other to the top of the cover in offset relation to the pivot means.

15. An automatic index device comprising a casing having an opening at one end, a drawer disposed therein, a stack of index sheets in the drawer, a cover for the drawer, pivot means attaching the rear of the cover to the drawer whereby engagement of the cover with the top of the casing on the closing of the drawer lowers the cover to closed position, an index scale fixed to the outer end of the cover, a finder movably supported at the end of the cover cooperating therewith, a finger fixed to the finder adapted to engage selected ones of the sheets and on the opening of the cover to automatically separate the sheets accordingly, a latch releasable in response to a tap of the index scale for automatically retaining the drawer in closed position comprising respective projections formed on the cover and the top of the casing positioned to engage when the drawer is closed, a spring attached to the cover for maintaining the projections in engagement, other spring means connected to the drawer and casing tending to eject the drawer, and means cooperating with the latter spring means for opening the cover on the release of the latch comprising a tape connected between the cover and casing effective to restrain the movement of the cover on the outward movement of the drawer thereby turning the cover on the pivot means.

16. An automatic index device comprising a casing having an opening at one end, a drawer disposed therein, a stack of index sheets in the drawer, a cover for the drawer, pivot means attaching the rear of the cover to the drawer whereby engagement of the cover with the top of the casing on the closing of the drawer lowers the cover to closed position, a finder movably supported at the end of the cover, a finger fixed to the finder adapted to engage selected ones of the index sheets and on the opening of the cover to automatically separate the sheets accordingly, a latch releasable in response to pressure on the upper surface of the cover for retaining automatically the drawer in closed position comprising respective projections formed on the cover and the top of the casing positioned to engage when the drawer is closed, a spring effective between the cover and drawer tending to turn the cover for a small angular distance about the pivot means for maintaining the projections in engagement, other spring means connecting the drawer and casing constantly tending to eject the drawer from the casing, and means cooperating with the latter spring means for opening the cover after the latch has been released and the drawer has moved outwardly for a predetermined distance which comprises a tape connected between the cover and casing effective to restrain the movement of the cover with respect to the drawer whereby continued outward movement of the drawer turns the cover on the pivot means.

HILDAUR L. NEILSEN.

REFERENCES CITED

The following references are of record in the file of this patent:

UNITED STATES PATENTS

| Number | Name | Date |
|---|---|---|
| 63,104 | Shoerken | Mar. 19, 1867 |
| 1,225,169 | Perreten | May 8, 1917 |
| 1,434,265 | Rosine et al. | Oct. 31, 1922 |
| 1,870,553 | Bullen | Aug. 9, 1932 |
| 2,223,966 | Peters | Dec. 3, 1940 |
| 2,506,261 | Zandelin | May 2, 1950 |